United States Patent
Nakajima et al.

(10) Patent No.: US 11,777,144 B2
(45) Date of Patent: Oct. 3, 2023

(54) SECONDARY BATTERY

(71) Applicant: POWER IV, Inc., Tokyo (JP)

(72) Inventors: Junji Nakajima, Tokyo (JP); Akimichi Degawa, Tokyo (JP)

(73) Assignee: POWER IV, INC., Tokyo (JP)

( * ) Notice: Subject to any disclaimer, the term of this patent is extended or adjusted under 35 U.S.C. 154(b) by 189 days.

(21) Appl. No.: 17/209,783

(22) Filed: Mar. 23, 2021

(65) Prior Publication Data

US 2021/0305626 A1 Sep. 30, 2021

(30) Foreign Application Priority Data

Mar. 25, 2020 (JP) ................. 2020-054612

(51) Int. Cl.
*H01M 10/0565* (2010.01)
*H01M 4/134* (2010.01)
*H01M 4/525* (2010.01)
*H01M 4/02* (2006.01)

(52) U.S. Cl.
CPC ....... *H01M 10/0565* (2013.01); *H01M 4/134* (2013.01); *H01M 4/525* (2013.01); *H01M 2004/027* (2013.01); *H01M 2004/028* (2013.01); *H01M 2300/0082* (2013.01)

(58) Field of Classification Search
None
See application file for complete search history.

(56) References Cited

U.S. PATENT DOCUMENTS

2020/0006753 A1* 1/2020 Nakajima ......... H01M 10/0562

FOREIGN PATENT DOCUMENTS

| CN | 206451769 | * | 8/2017 |
| JP | H05-242911 A | | 9/1993 |
| JP | 2542221 B2 | * | 10/1996 |
| JP | 2000-149885 | * | 5/2000 |
| JP | 2019-050120 | * | 3/2019 |
| WO | WO 2019/027016 | * | 7/2019 |

OTHER PUBLICATIONS

Machine translation of CN 206451769, published on Aug. 29, 2017 (Year: 2017).*
Machine translation of JP 2000-149885, published on May 30, 2000 (Year: 2000).*
Machine translation of JP 2019-050120, published on Mar. 28, 2019 (Year: 2019).*
Machine translation of JP 2542221B2, published on Oct. 9, 1996 (Year: 1996).*

* cited by examiner

*Primary Examiner* — Anca Eoff
(74) *Attorney, Agent, or Firm* — Rabin & Berdo, P.C.

(57) ABSTRACT

A secondary battery includes: a first electrode configured to function as a p-type semiconductor; a second electrode configured to function as an n-type semiconductor; and a solid electrolyte provided between the first electrode and the second electrode, the solid electrolyte contains a compound and polyethylene oxide, the compound has a perovskite structure.

9 Claims, 1 Drawing Sheet

SECONDARY BATTERY

TECHNICAL FIELD

The present invention relates to a secondary battery.

BACKGROUND ART

Currently, lithium ion secondary batteries are widely used. The lithium ion secondary batteries generally include a positive electrode that contains lithium-containing transition metal composite oxides as an active material, a negative electrode that contains, as an active material, a material that allows occlusion and release of lithium ions, a non-aqueous electrolyte, and a separator (for example, see JPH5-242911A).

In recent years, the secondary batteries are widely used for not only mobile electronic devices, but also, as stationary batteries, etc. such as those for an electric vehicle, a smart grid, a humanoid robot, a drone, an electric power load leveling system, and so forth. Thus, development of a high capacity/small sized secondary battery that has an input/output performance higher than that of the conventional lithium ion secondary batteries is expected.

SUMMARY OF INVENTION

However, the conventional lithium ion secondary batteries have limitations in terms of output and capacity per unit weight. In addition, because the conventional lithium ion secondary batteries are electrochemical batteries, there is a limitation in terms of size reduction.

An object of the present invention is to provide a secondary battery that is capable of achieving the high input/output performance and the high capacity.

According to an aspect of the present invention, a secondary battery includes: a first electrode configured to function as a p-type semiconductor; a second electrode configured to function as an n-type semiconductor; and a solid electrolyte provided between the first electrode and the second electrode, the solid electrolyte contains a compound and polyethylene oxide, the compound has a perovskite structure.

BRIEF DESCRIPTION OF DRAWINGS

The FIGURE is a schematic view of a secondary battery according to an embodiment of the present invention.

DESCRIPTION OF EMBODIMENT

Figure 1:
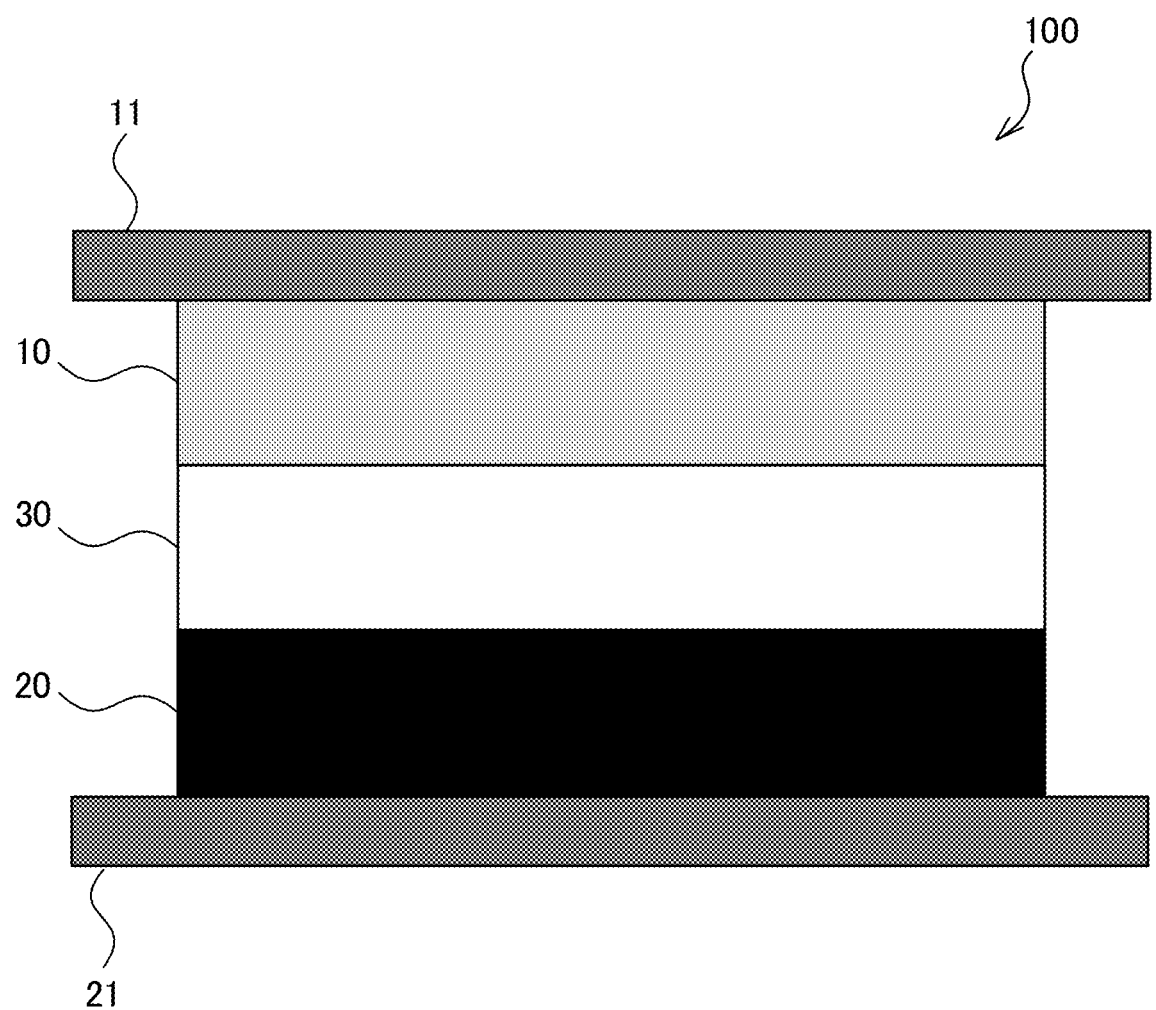

A secondary battery according to an embodiment of the present invention will be described below with reference to the drawings.

[Overall Configuration of Secondary Battery 100]

As shown in the FIGURE, a secondary battery 100 is provided with an electrode 10 serving as a first electrode that functions as a p-type semiconductor, an electrode 20 serving as a second electrode that functions as an n-type semiconductor, and a solid electrolyte 30 that is provided between the electrode 10 and the electrode 20.

The electrode 10 is in contact with a current collector 11 and functions as a positive electrode. The electrode 10 contains, for example, nickel oxide or lithium nickel oxide. The electrode 20 is in contact with a current collector 21 and functions as a negative electrode. The electrode 20 contains at least one of silicon and graphene. The solid electrolyte 30 contains a compound and polyethylene oxide (hereinafter, referred to as PEO), the compound has a perovskite structure. The compound having the perovskite structure contains, for example, $LiNbO_3$ and $Li_3PS_4$, or $LiBH_4$. The electrode 10, the electrode 20, and the solid electrolyte 30 are formed as the films so as to form the flat planes. The electrode 10 and the electrode 20 face with each other via the solid electrolyte 30 and do not come into contact physically.

The secondary battery 100 provided with the electrode 10 that functions as the p-type semiconductor, the electrode 20 that functions as the n-type semiconductor, and the solid electrolyte 30 is charged/discharged by movement of the holes, but not by movement of the ions as in the case of a conventional lithium ion secondary battery. Specifically, when the secondary battery 100 is charged, a terminal of an external power source (not shown) with a higher electric potential is electrically connected to the electrode 10 and a terminal of the external power source with a lower potential is electrically connected to the electrode 20, and thereby, the holes are generated in the electrode 10. Furthermore, the holes in the electrode 10 move to the electrode 20 through the solid electrolyte 30. When the secondary battery 100 is discharged, the electric potential in the electrode 10 is higher than the electric potential in the electrode 20, and due to this electric potential difference between the electrode 10 and the electrode 20, the holes in the electrode 10 move to the electrode 20 through an external load (not shown). In addition, the holes in the electrode 20 move to the electrode 10 through the solid electrolyte 30. Thus, current flows from the electrode 10 to the electrode 20 through the external load (not shown).

In the above, the holes are smaller than ions and have a higher movability. In other words, the secondary battery 100 is operated by the movement of the holes that is faster than the movement of the ions. Furthermore, because the solid electrolyte 30 contains PEO, for the movement of the holes between the electrode 10 and the electrode 20, PEO in the solid electrolyte 30 turns into radical, and thereby, the holes in the electrode 10 or the electrode 20 are rapidly transported to a counter electrode. Thus, the secondary battery 100 has a high rapid charge performance and a high input/output performance.

In addition, when the electrode 20 contains silicon, the movement of the holes is accelerated as pressure is applied to the compound having the perovskite structure in the solid electrolyte 30 due to expansion of silicon during the charging. Thus, the secondary battery 100 has the high rapid charge performance.

In addition, it is conceived that, in a case in which the electrode 20 contains graphene, in the electrode 20 during the charging, the holes move in the direction perpendicular to the direction of electric field in the electrode 10, and the electrons are accumulated in the direction opposite from the holes. In the electrode 20 during the discharging, a dielectric polarization reaction is caused, and then, the electrons accumulated in the electrode 20 are discharged outside at once, and the holes in the electrode 20 move towards the electrode 10 side. Thus, the secondary battery 100 has a high output performance.

In addition, because chemical reactions are not occurred in the operation of the secondary battery 100, the secondary battery 100 has a long service life, a high capacity, the high input/output performance, the high rapid charge performance, and a high safety.

As described above, because the secondary battery 100 is operated by the movement of the holes, the battery can be said to be based on the principle of a semiconductor battery.

The secondary battery 100 is operated by the movement of the holes but not of the ions, and in addition, because PEO in the solid electrolyte 30 turns into the radical such that the holes are transported rapidly between the electrode 10 and the electrode 20, the secondary battery 100 has the high input/output performance and the high capacity.

[Electrode 10]

The electrode 10 contains a positive-electrode electrode material that is formed by mixing a composite oxide, a positive electrode binding agent, and a conductive material.

The composite oxide contains, for example, nickel oxide or lithium nickel oxide. The composite oxide is p-doped with antimony, etc., for example. Thus, the electrode 10 functions as the p-type semiconductor, and the holes are generated in the electrode 10. It is confirmed by a hole determination that an amount of the holes relative to the metal ions in nickel-containing nickel oxide and lithium nickel oxide is greater than that in common positive electrode materials including manganese, cobalt, iron, and so forth. Therefore, by containing nickel oxide, more holes are contained in the electrode 10, and the performance of the secondary battery 100 is improved. In the above, manganese oxide, cobalt oxide, and iron oxide may be included instead of nickel oxide. In addition, lithium manganese oxide, lithium cobalt oxide, lithium iron phosphate, and so forth may be included instead of lithium nickel oxide.

The positive electrode binding agent is, for example, carboxymethyl cellulose (CMC) having thickening effect, and the positive electrode binding agent is prepared by mixing with MAC-350HC (from Nippon Paper Industries Co., Ltd.) and modified acrylonitrile rubber (such as BM-451B from Zeon Corporation), for example. A binding agent composed of polyacrylic acid monomer having an acrylic group (SX9172 from Zeon Corporation) is preferably used as the positive electrode binding agent. In addition, acetylene black, Ketjen black, various graphite, graphene, carbon nanotubes, carbon nanofibers may be used solely or in combination as a conductive agent.

If the above-described materials are used as the electrode binding agent, a crack is less likely to be formed in the electrode 10 when the secondary battery 100 is assembled, and so, it is possible to improve a yield. In addition, if the material having the acrylic group is used as the positive electrode binding agent, resistance for the movement of the holes is lowered, and so, the holes are allowed to be more movable in the electrode 10.

In the above, it is preferable that graphene, a perovskite material, or solid electrolyte material be present in the positive electrode binding agent having the acrylic group. In such a case, the positive electrode binding agent does not act as a resistive component and the electrons and the holes are less likely to be trapped, and so, the holes are allowed to be more movable in the electrode 10. Specifically, if graphene, the perovskite material, or the solid electrolyte material is present in the positive electrode binding agent having the acrylic group, the movement of the holes in the electrode 10 is less likely to be inhibited. If these materials are contained, an acrylic resin layer can cover an active material, and so, the battery is prevented from being operated as an electrochemical battery through the chemical reactions of the active material, and the battery utilizing the movement of the holes as the semiconductor is achieved.

Furthermore, if graphene, elemental phosphorus, the perovskite material, or the solid electrolyte material is present in the acrylic resin layer, while an electric potential is lowered to lower an oxidation potential approaching the active material, the holes can move without being buffered.

In addition, the acrylic resin layer has an excellent withstanding voltage. Therefore, the electrode 10 can be used at high voltage and can realize the high capacity and the high output. In addition, because the chemical reactions are not occurred, temperature increase at the time of high output is also suppressed. Thus, it is possible to improve the service life and the safety.

[Electrode 20]

The electrode 20 contains a negative-electrode electrode material that is formed by mixing a negative electrode active material and a negative electrode binding agent. As the negative electrode binding agent, materials similar to those for the positive electrode binding agent may be used. The negative-electrode electrode material may further be mixed with the conductive material.

The negative electrode active material contains at least one of silicon and graphene. Silicon is, for example, SiOxa (xa<2). Graphene has a nano-level layered structure with at most ten layers. Graphene may include carbon nanotubes. In addition, the electrode 20 may contain various types of natural graphite, synthetic graphite, a silicon-based composite material (such as silicide), a silicon oxide-based material, tin oxide, titanium oxide, a titanium alloy-based material, and various types of alloy composition materials solely or in combination.

The negative electrode active material is n-doped with, for example phosphorus oxide, sulfur oxide, arsenic, or the like. The doping of phosphorus oxide or sulfur oxide is performed by addition and dispersion by a high shear disperser, for example. Thus, the electrode 20 functions as the n-type semiconductor and is formed so as to allow the occlusion and release of the ions, the holes, and the electrons generated in the electrode 10. Here, the negative electrode active material may be doped with other metal element. For example, alkali metal such as lithium, sodium, potassium and so forth, and a transition metal such as copper, titanium, zinc and so forth may also be doped.

Because it is difficult for silicon and graphene to function as a heat generating element, the generation of the heat tends not be caused even if an internal short circuit is caused in the secondary battery 100, and therefore, it is possible to improve the safety and the service life of the secondary battery 100. Especially, if the electrode 20 contains a mixture of silicon and graphene, it is possible to improve occlusion efficiency of the holes, and at the same time, it is possible to provide an electron accumulation layer.

[Solid Electrolyte 30]

The solid electrolyte 30 contains the compound and PEO, the compound has the perovskite structure. The compound having the perovskite structure contains, for example, $LiNbO_3$ and $Li_3PS_4$, or $LiBH_4$. The solid electrolyte 30 may also contain a dielectric material such as sodium potassium niobate, bismuth ferrite, sodium niobate, bismuth titanate, sodium bismuth titanate, and so forth.

The weight ratio of PEO relative to the solid electrolyte 30 is from 3% to 20%. Such weight ratio is set because: if the weight ratio of PEO is lower than 3%, a fixing force of the solid electrolyte 30 cannot be retained, and it becomes difficult to ensure a stability of the solid electrolyte 30; and if the weight ratio is higher than 20%, the solid electrolyte 30 tends to undergo oxidative degradation at a high potential, and the service life of the secondary battery 100 is shortened. In other words, if the weight ratio of PEO relative to the solid electrolyte 30 is from 3% to 20%, it is possible to make the solid electrolyte 30 to retain the fixing force, and furthermore, it is possible to make the solid electrolyte 30 less likely to undergo the oxidative degradation at the high potential. By virtue of the solid electrolyte 30, the holes are transported between the electrode 10 and the electrode 20, and a physical contact between the electrode 10 and the electrode 20 is prevented. The solid electrolyte 30 is formed in one or more layers.

[Current Collectors 11 and 21]

The current collectors 11 and 21 serving as a current collector of the electrode 10 and 20 is formed of stainless steel, for example. Thus, it is possible to increase an electric potential range at low cost.

Example

Example of the secondary battery 100 according to this embodiment of the present invention will be described below. Note that the present invention is not limited to the following examples.

Comparative Example 1

The conventional lithium ion secondary battery will be first mentioned for comparison.

The positive-electrode electrode material was prepared by stirring nickel manganese lithium cobaltate BC-618 from Sumitomo 3M Limited, PVDF #1320 from KUREHA CORPORATION (a solution in N-methyl pyrrolidone (NMP) at a solid content of 12 parts by weight), and acetylene black at a weight ratio of 3:1:0.09 together with additional N-methyl pyrrolidone (NMP) by using a twin-arm kneader. The positive-electrode electrode material was coated on an aluminum foil having a thickness of 13.3 μm. After dried, the aluminum foil was subjected to a rolling so as to have a total thickness of 155 μm, and subsequently, the aluminum foil was cut into a specific size to form a positive electrode.

On the other hand, the negative-electrode electrode material was prepared by stirring synthetic graphite, a styrene-butadiene copolymer rubber particle binder BM-400B from Zeon Corporation (solid content: 40 parts by weight), and carboxymethyl cellulose (CMC) at a weight ratio of 100:2.5:1 together with a suitable amount of water by using a twin-arm kneader. The negative-electrode electrode material was coated on a copper foil having a thickness of 10 μm. After dried, the copper foil was subjected to a rolling so as to have a total thickness of 180 μm, and subsequently, the copper foil was cut into a specific size to form a negative electrode.

A laminar structure was formed by interposing a polypropylene micro-porous film having a thickness of 20 μm as the separator between the positive electrode and the negative electrode, and the laminar structure was inserted into a battery casing can after cut into a predetermined size. An electrolyte was prepared by dissolving $LiPF_6$ (1M) in a mixed solvent formed by mixing ethylene carbonate (EC), dimethyl carbonate (DMC), and methyl ethyl carbonate (MEC). The electrolyte was injected into the battery casing can under a dry-air atmosphere and left it for a certain period. Subsequently, a preliminary charging was performed for about 20 minutes with an electric current equivalent to 0.1 C, and the battery casing can was sealed to form a stacked lithium ion secondary battery. Thereafter, an aging was performed by leaving the lithium ion secondary battery under a normal temperature environment for a certain period.

Comparative Example 2

In a coating formation of the solid electrolyte 30 of the below mentioned example, a dispersion of a solid electrolyte that does not contain PEO but contains $LiNbO_3$ and $Li_3PS_4$ in a solvent was coated to form a battery.

Example

Next, the secondary battery 100 according to the first embodiment of the present invention will be mentioned.

To a material obtained by adding antimony (Sb) (Kojundo Chemical Laboratory Co., Ltd.) to lithium nickel oxide (JFE Mineral Corporation) at an amount equivalent to 0.4 wt %, graphene (Graphenetype-R from XGSciencess) as the conductive member and the binding agent composed of polyacrylic acid monomer having an acrylic group (SX9172 from Zeon Corporation) were stirred and dispersed at a solid content weight ratio of 92:3:5 together with N-methyl pyrrolidone (NMP) by using FILMIX (a thin film spinning high-speed mixer from PRIMIX Corporation) to form the positive-electrode electrode material.

The positive-electrode electrode material was coated on a SUS current collector foil (Nippon Steel & Sumikin Materials Co., Ltd.) having a thickness of 13 μm. After dried, the current collector foil was subjected to a rolling so as to have a surface density of 26.7 mg/cm². Subsequently, the current collector foil was cut into a specific size to obtain the electrode 10. The hole effect of the electrode 10 was determined, and it was confirmed that the electrode 10 was the p-type semiconductor.

On the other hand, graphite having a particle diameter along the longitudinal axis of 1 to 10 μm (Shanghai Suzy Technology Co., Ltd.) and silicon having a spherical particle diameter of from 30 to 200 nm (Shanghai Suzy Technology Co., Ltd.) were treated and mixed together at a weight ratio of 1:1 using NOB-130 (Nobilta) from Hosokawa Micron Corporation at 800 rpm for 3 minutes. The mixture, a graphene material ("xGnP Graphene Nanoplatelets H type" from XG Sciences, Inc.), a solution of a CMC (MAC350HC from Nippon Paper Industries Co., Ltd.) in water at 1.4 wt %, and a binding agent formed of an emulsion of polyacrylic acid monomer (BM451B from Zeon Corporation) were stirred for a certain period using a twin-arm mixer at a blending ratio to achieve a weight proportions of 90.8%, 4.32%, 1.96%, and 2.92%, respectively. Subsequently, to the stirred mixture, phosphorus pentoxide (Kojundo Chemical Laboratory Co., Ltd.) was added at a weight ratio of 1:0.005 using FILMIX (PRIMIX Corporation) to form the negative electrode coating material.

A SUS current collector foil having a thickness of 13 μm (Nippon Steel & Sumikin Materials Co., Ltd.) was coated with the negative-electrode electrode material, dried, and subsequently, the current collector foil was subjected to a rolling so as to have a surface density of 5.2 mg/cm². Thereafter, the current collector foil was cut into a specific size to form the electrode 20.

A mixture of PEO-3 (from Sumitomo Seika Chemicals Company, Limited) and PEO-18 (from Sumitomo Seika Chemicals Company, Limited) at 1:1 weight ratio was mixed, at weight ratio of 10%, with the solid electrolyte containing $LiNbO_3$ and $Li_3PS_4$. Thus obtained mixture was mixed with the solvent (NMP (normal methyl pyrrolidone)) and then coated on the electrode 20 to form the solid electrolyte 30. The solid electrolyte 30 is provided between the electrode 10 and the electrode 20, thereby forming the secondary battery 100.

The batteries of the example and the comparative example produced as described above were evaluated by methods described below.

(Evaluation of Battery Initial Capacity)

A comparative performance evaluation of the capacity of the secondary battery was performed by setting 1 C discharged capacity in the specification electric potential range of 1 V to 3.8 V in the comparative example to 100. In addition, for the shape of the battery, a rectangular battery can was employed to obtain a laminated battery in this evaluation. Furthermore, a discharge capacity ratio of 10 C/1 C was measured. As a result, a high output performance was evaluated. Similarly, a charge capacity ratio of 10 C/1 C was measured. As a result, an input performance and a rapid charge performance were evaluated.

(Nail Penetration Test)

For a fully charged secondary battery, a state of heat generation and an appearance thereof were observed after the secondary battery was stabbed with an iron nail having a diameter of 2.7 mm to penetrate therethrough under a normal temperature environment at a speed of 5 mm/sec. The results are shown in Table 1 below. In Table 1, the secondary battery, in which no change was observed in the temperature and appearance of a secondary battery, is indicated as "OK", and the secondary battery, in which a change was observed in the temperature and the appearance of the secondary battery, is indicated as "NG".

(Overcharge Test)

The current was maintained at a charge rate of 200%, and it was determined whether or not a change in the appearance was caused for a period of more than 15 minutes. The results are shown in Table 1 below. In Table 1, the secondary battery in which an abnormality was not caused is indicated as "OK", and the secondary battery in which a change (swollen, explosion, or the like) was caused is indicated as "NG".

(Normal Temperature Service Life Characteristic)

The secondary batteries in the example and the comparative example (the specification electric potential range of 1 V to 3.8 V) were subjected to, at 25° C., a cycle of charging at 1 C/3.8 V and discharging at 1 C/1 V for 3,000 cycles and 10,000 cycles. Decrease in the capacity was compared with the initial capacity.

(Evaluation Results)

Table 1 shows the results of the evaluation described above.

increased in the solid electrolyte layer, and the resistance was increased. Thus, with the configuration in which the solid electrolyte layer does not contain PEO, it is difficult to achieve the high input/the output performance such as those achieved with the secondary battery 100. In addition, Because the binding force of the solid electrolyte layer is lowered and holding stability of the layer is lowered, the service life and the production stability are lowered considerably.

The configurations, operations, and effects of the embodiments of the present invention configured as described above will be collectively described.

The secondary battery 100 is provided with: the electrode 10 configured to function as the p-type semiconductor; the electrode 20 configured to function as the n-type semiconductor; and the solid electrolyte 30 provided between the electrode 10 and the electrode 20, wherein the solid electrolyte 30 contains the compound and polyethylene oxide, the compound has the perovskite structure.

With this configuration, the secondary battery 100 is operated by the movement of the holes but not of the ions, and in addition, because polyethylene oxide in the solid electrolyte 30 turns into the radical such that the holes are transported rapidly between the electrode 10 and the electrode 20, the secondary battery 100 has the high input/output performance and the high capacity.

In the secondary battery 100, the weight ratio of polyethylene oxide relative to the solid electrolyte 30 is from 3% to 20%.

With this configuration, it is possible to make the solid electrolyte 30 to retain the fixing force, and furthermore, it is possible to make the solid electrolyte 30 less likely to undergo the oxidative degradation at the high potential.

In the secondary battery 100, the compound having the perovskite structure contains $LiNbO_3$ and $Li_3PS_4$, or $LiBH_4$.

In the secondary battery 100, the electrode 10 contains nickel oxide or lithium nickel oxide.

With this configuration, because the amount of the holes relative to the metal ions in nickel oxide and lithium nickel oxide is greater than that in the common positive electrode materials, the performance of the secondary battery 100 is improved.

TABLE 1

|  | Capacity ratio at 1C discharge rate | Capacity (1C) [mAh/g] 2-4.3 V | Capacity (1C) [mAh/g] 2-4.6 V | 10C/1C discharge capacity ratio | 10C/1C charge capacity ratio | 3000 cycle service life test (capacity retaining ratio) [%] | 10000 cycle service life test (capacity retaining ratio) [%] | SAFETY TEST Overcharge | SAFETY TEST Nail penetration test |
|---|---|---|---|---|---|---|---|---|---|
| Comparative Example 1 | 100 | 168 | NG deteriorated | 0.04 | 0.03 | 58 | 0 | NG | NG |
| Comparative Example 2 | 289 | 486 | 503 | 0.47 | 0.44 | 64 | 42 | OK | OK |
| Example | 337 | 566 | 637 | 0.90 | 0.91 | 97 | 91 | OK | OK |

As described above, because the secondary battery 100 can be charged even under the high rate charging, the rapid charging can be performed. In addition, it is indicated that, because good discharging performance is achieved under high C rate, high output can be achieved. By performing an observation of a solid electrolyte layer not containing PEO by SEM, it was found that evaporation of the solvent likely to form voids. It was found that, as a result, portions at which transportation paths of the holes are interrupted were In the secondary battery 100, the electrode 20 contains at least one of silicon and graphene.

Embodiments of this invention were described above, but the above embodiments are merely examples of applications of this invention, and the technical scope of this invention is not limited to the specific constitutions of the above embodiments.

This application claims priority based on Japanese Patent Application No. 2020-54612 filed with the Japan Patent Office on Mar. 25, 2020, the entire contents of which are incorporated into this specification.

The invention claimed is:

1. A secondary battery comprising:
a first electrode configured to function as a p-type semiconductor;
a second electrode configured to function as an n-type semiconductor; and
a solid electrolyte provided between the first electrode and the second electrode, wherein
the solid electrolyte contains polyethylene oxide and a compound that has a perovskite structure, and
the compound having the perovskite structure contains $LiNbO_3$ and $Li_3PS_4$, or $LiBH_4$.

2. The secondary battery according to claim 1, wherein a weight ratio of polyethylene oxide relative to the solid electrolyte is in a range from 3% to 20%.

3. The secondary battery according to claim 1, wherein the first electrode contains nickel oxide or lithium nickel oxide.

4. The secondary battery according to claim 1, wherein the second electrode contains at least one of silicon and graphene.

5. The secondary battery according to claim 1, wherein the solid electrolyte is charged and discharged only by a movement of holes generated at the first electrode.

6. A secondary battery comprising:
a first electrode configured to function as a p-type semiconductor;
a second electrode configured to function as an n-type semiconductor; and
a solid electrolyte provided between the first electrode and the second electrode, wherein
the solid electrolyte contains polyethylene oxide and a compound that has a perovskite structure, and
the solid electrolyte is charged and discharged only by a movement of holes generated at
the first electrode.

7. The secondary battery according to claim 6, wherein a weight ratio of polyethylene oxide relative to the solid electrolyte is in a range from 3% to 20%.

8. The secondary battery according to claim 6, wherein the first electrode contains nickel oxide or lithium nickel oxide.

9. The secondary battery according to claim 6, wherein the second electrode contains at least one of silicon and graphene.

* * * * *